United States Patent [19]

Ehrlich

[11] Patent Number: 4,904,017

[45] Date of Patent: Feb. 27, 1990

[54] TRAILER CONSTRUCTION

[75] Inventor: Rodney P. Ehrlich, Monon, Ind.

[73] Assignee: Monon Corporation, Monon, Ind.

[21] Appl. No.: 705,609

[22] Filed: Feb. 26, 1985

[51] Int. Cl.[4] .............................................. B62D 27/02
[52] U.S. Cl. .................................... 296/181; 296/191; 296/197; 296/29
[58] Field of Search ................. 296/181, 182, 191, 29, 296/187, 197; 105/422; 52/582, 584, 464, 282

[56] References Cited

U.S. PATENT DOCUMENTS

| | | | |
|---|---|---|---|
| 1,913,066 | 6/1933 | Carter | 52/582 X |
| 2,100,323 | 11/1937 | Fitch | 296/28 |
| 2,283,574 | 5/1942 | Pillsbury | 52/464 X |
| 2,820,990 | 1/1958 | Johnson | 52/461 X |
| 2,841,415 | 7/1958 | Black | 296/181 X |
| 2,883,233 | 4/1959 | Beckley | 296/181 |
| 2,888,297 | 5/1959 | Ridgway | 296/181 |
| 2,934,372 | 4/1960 | Jewell et al. | 296/28 |
| 2,991,116 | 7/1961 | Andrews | 296/181 |
| 3,003,810 | 10/1961 | Kloote et al. | 296/181 X |
| 3,141,697 | 7/1964 | Tenenbaum et al. | 296/181 |
| 3,265,417 | 8/1966 | Kastan | 52/582 X |
| 3,266,837 | 8/1966 | Stricker, Jr. et al. | 296/181 |
| 3,393,920 | 7/1968 | Ehrlich | 296/181 |
| 3,393,920 | 7/1968 | Ehrlich | 280/106 |
| 3,557,501 | 1/1971 | Kolozsvary | 52/584 X |
| 3,692,349 | 9/1972 | Ehrlich | 296/181 |
| 3,788,682 | 4/1971 | Ehrlich | 296/28 |
| 3,834,575 | 9/1974 | Carr | 220/1.5 |
| 3,842,755 | 10/1974 | Carr | 105/480 |
| 4,018,480 | 4/1977 | Stone | 296/181 X |
| 4,184,302 | 1/1980 | Gurewitsch et al. | 52/582 |
| 4,212,405 | 7/1980 | Schmidt | 220/1.5 |
| 4,262,961 | 4/1981 | Schmidt | 296/182 |
| 4,290,642 | 9/1981 | Wise | 296/182 |
| 4,351,558 | 9/1982 | Mueller | 52/282 X |
| 4,357,047 | 11/1982 | Katz | 296/181 |
| 4,455,807 | 6/1984 | Ehrlich | 52/582 X |
| 4,531,278 | 7/1985 | Boykin | 29/469 |

FOREIGN PATENT DOCUMENTS

| | | | |
|---|---|---|---|
| 698815 | 11/1979 | U.S.S.R. | 105/422 |
| 1098850 | 6/1984 | U.S.S.R. | 105/422 |

OTHER PUBLICATIONS

"Strick Armorplate Trailers", (4-page Strick brochure).
3-page article from Nov. 1984 edition of Trailer Builders, pp. 33–35.
2-page Strick document entitled "Armorplate General Specifications".
6-page document entitled "Strick Series 80".
Transport Topics, Jan. 30, 1984 edition, p. 20.

Primary Examiner—Russell D. Stormer
Attorney, Agent, or Firm—Barnes & Thornburg

[57] ABSTRACT

A trailer construction comprises a floor, a roof and a pair of sidewalls, wherein each of the sidewalls comprises a plurality of similar generally flat rectilinear side panels of predetermined thickness, width and height. These side panels are aligned in a side-by-side arrangement and a plurality of joining panels join and strengthen respective adjacent pairs of these side panels. Each of these joining panels includes at least a relatively flat, rectilinear joining portion of a predetermined thickness. Fasteners are also provided for coupling the joining panels to the respective adjacent pairs of side panels, the aggregate thickness of the side panels and the joining panels being minimized, so as to maximize the interior width of the trailer between the interior surfaces of the sidewalls. The trailer floor preferably includes a longitudinal convexity with respect to the trailer interior to encourage a substantially flat condition of the floor in response to an applied load. This avoids inward tilting of a first load member placed adjacent one sidewall to allow loading of a further load member without interference from the first load member, hence also maximizing usable interior width.

15 Claims, 3 Drawing Sheets

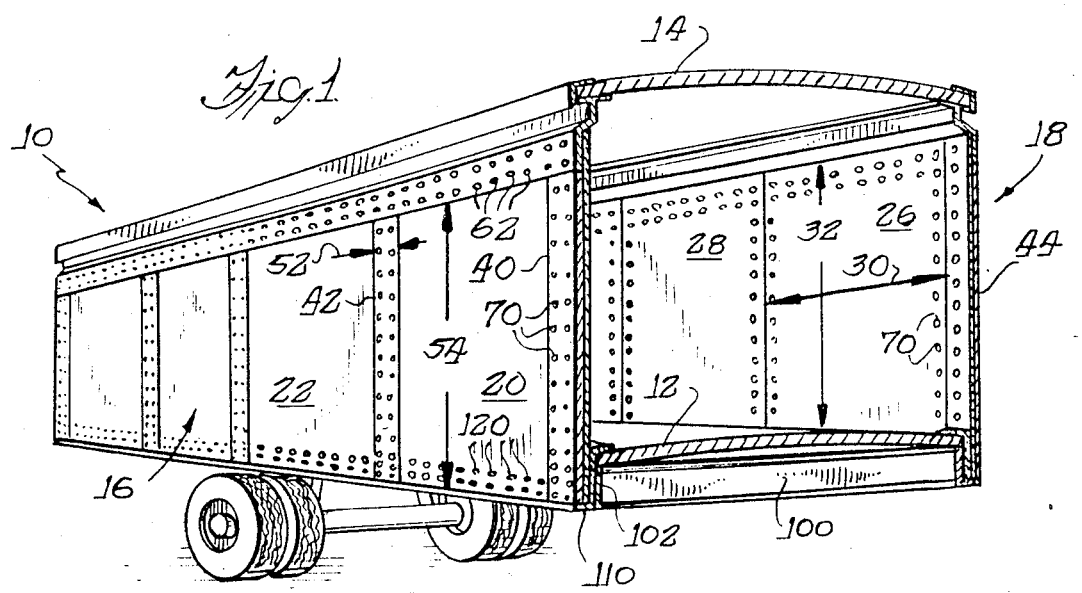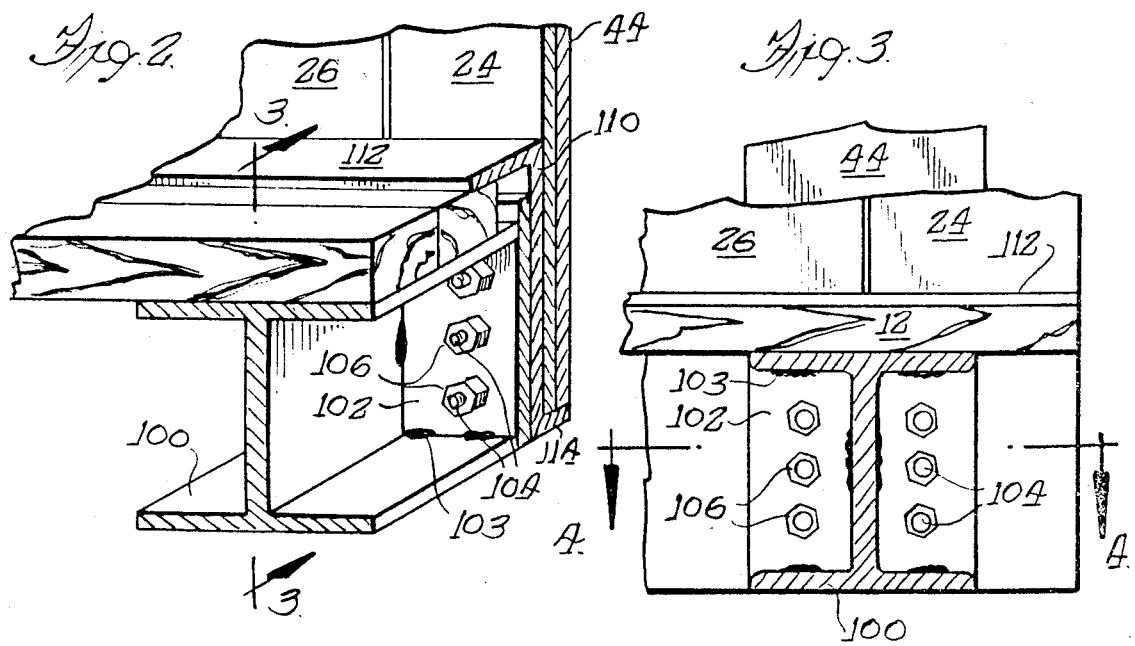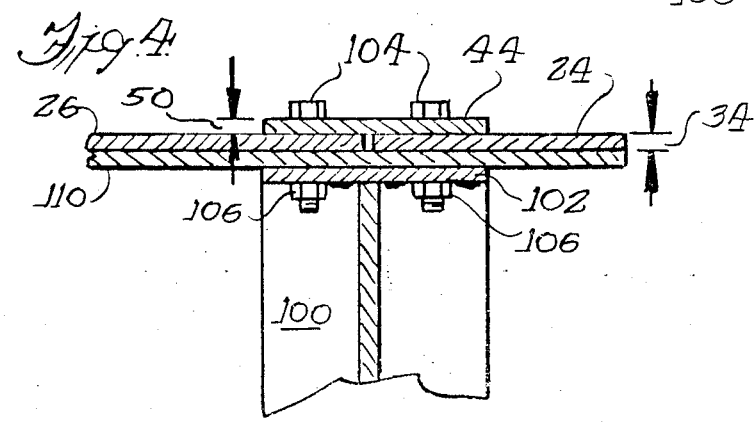

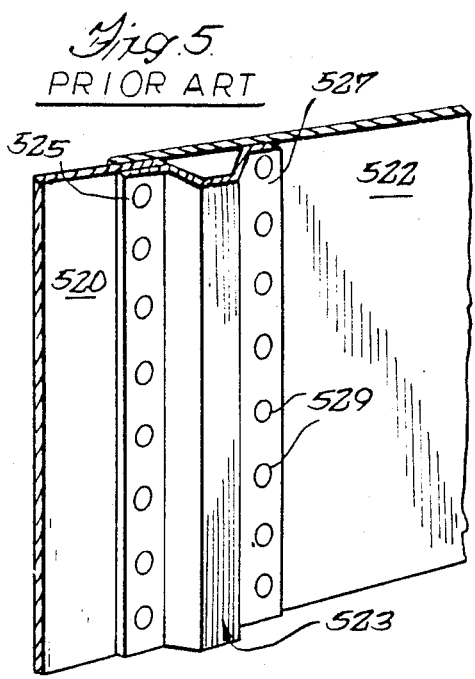
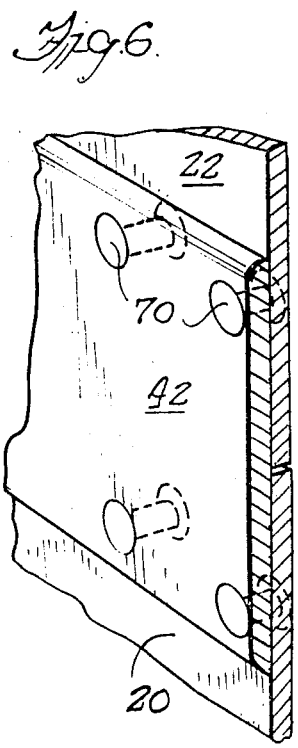
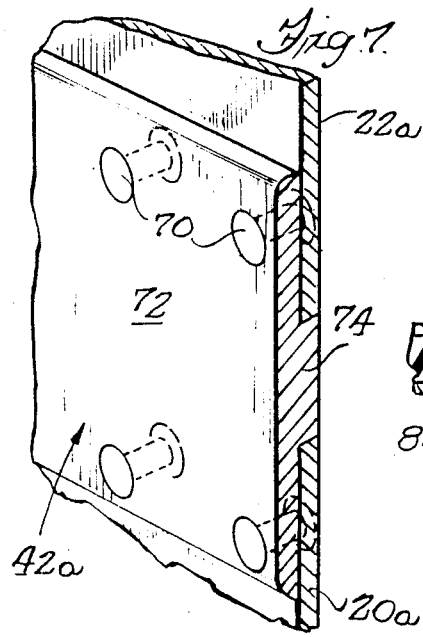
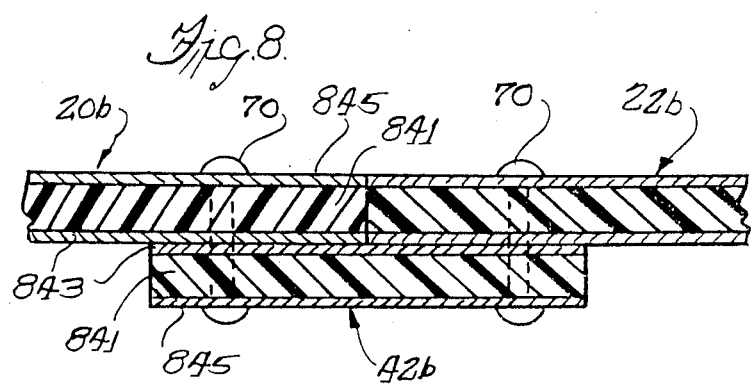
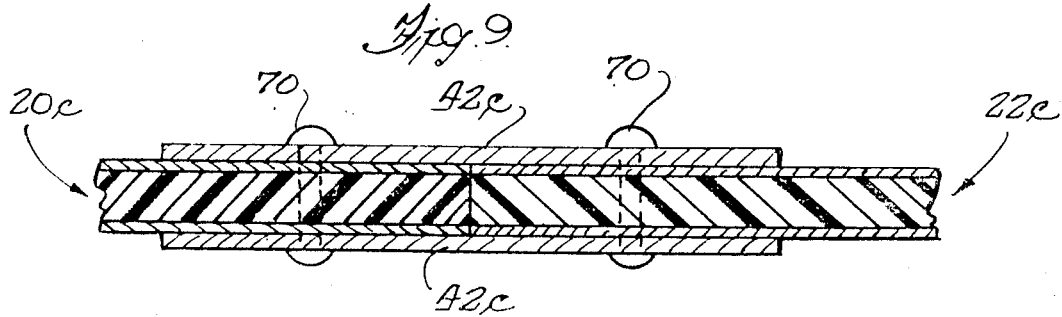

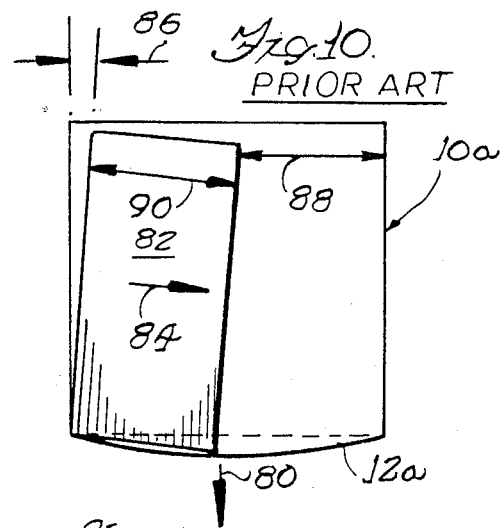
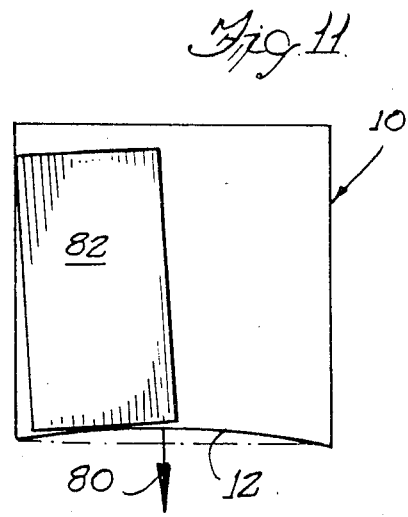
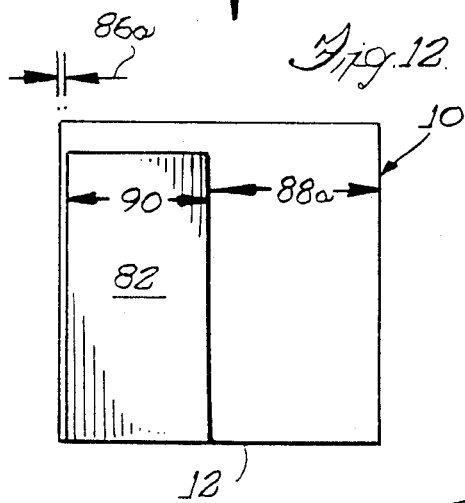
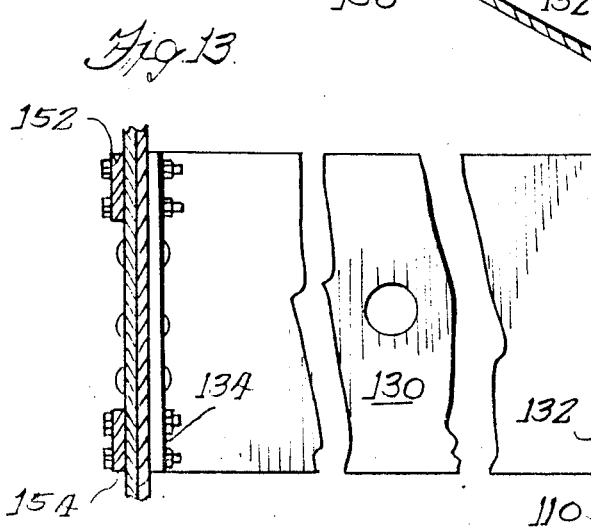
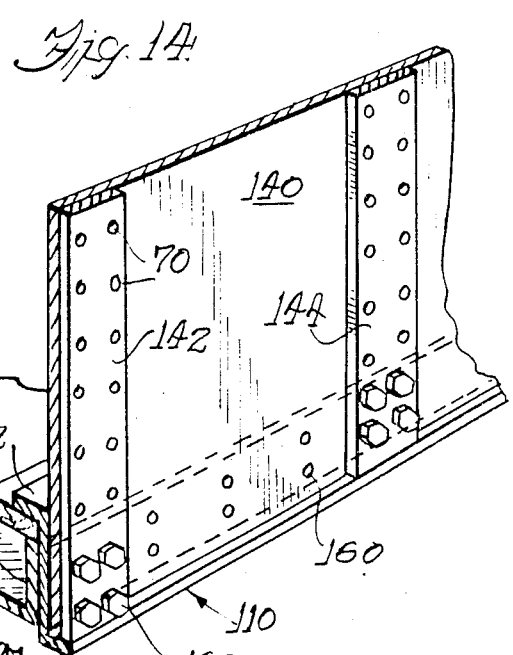

TRAILER CONSTRUCTION

BACKGROUND OF THE INVENTION

This invention relates generally to trailer construction and more particularly to an improved and novel construction for maximizing interior trailer width while maintaining desired structural strength of the trailer sidewalls.

Today, many trailers and other such containers or constructions utilize rectangular panels to form the sides thereof. Heretofore, such trailer bodies have been proposed with various constructions generally including a base frame, and sidewalls having relatively thin sheet material panels fixed to portions of the base frame with closely spaced fasteners such as rivets. Generally, the relatively thin sidewall panel members are joined and/or stiffened by the addition of a number of relatively thick vertical frame members or stiffening members coupled thereto and spaced apart over the length thereof. Such stiffening members often taken the form of sheet metal members which are formed by bending or extrusion into generally U-shaped rib members having extending marginal flanges for coupling to the sidewall panels.

However, regulations governing over the road vehicles, as well as practical considerations in some container applications, generally limit the overall width of the trailer or other container or cargo carrying structure. With such width restrictions, it will be appreciated that the overall effective thickness of the combined sidewall panels and stiffener and/or joining members or ribs applied thereto detracts from the interior width of the trailer or other container. In many instances, standardized sub-containers or pallets for various cargos are sized such that but a single palletized load may be accommodated across the width of a trailer or container of the above-described prior art construction. However, in many instances but an additional inch or even less of interior width would permit two such standardized containerized or palletized loads to be placed side-by-side within the trailer or container.

As an additional matter, we have observed that some downward bowing or concavity of the floor portion of prior art trailer constructions often occurs in response to the loading thereof. Accordingly, as the load in the trailer increases in height, an increased gap is observed between the trailer sidewall and the upper portion of the load, even though the lower portion of the load is positioned so as to abut the sidewall. This downward bowing of the floor leads to such tilting of the load which may detract sufficiently from the available interior width of the trailer as to make the side-by-side loading of a second load of similar width difficult or impossible. This is particularly disadvantageous in the case of the above-mentioned palletized or containerized loads.

At least one prior art attempt has been made to decrease the effective thickness of the sidewall members by eliminating the joining and strengthening frame or rib members. This construction depends upon the strength and rigidity afforded by utilizing a single, relatively thick aluminum panel to form the sidewall of the trailer. However, it should be recognized that a typical such trailer is on the order of 47 feet in length and 112 inches in height. The width of aluminum plate utilized for sufficient rigidity must be at least on the order of ¼-inch. The fabrication of a ¼-inch thick aluminum plate in a single piece of on the order of 47 feet in length and 112 inches in height is extremely difficult and expensive, thus adding greatly to the expense of a completed trailer or container which must utilize two such panels for the sidewalls thereof. Moreover, the fabrication of a trailer with such large sidewall panels also can prove difficult and expensive both in handling as well as in achieving proper alignment and fastening of such panels with respect to other structural members of the trailer construction.

OBJECTS AND SUMMARY OF THE INVENTION

Accordingly, it is a general object of the invention to provide a novel and improved trailer construction.

A more specific object is to provide an improved trailer construction wherein the interior width of the trailer is minimized while maintaining desired structural strength of the sidewalls thereof.

A related object is to provide a trailer construction including sidewalls of minimal thickness and yet desired structural strength.

Yet a further object is to provide an improved trailer construction in accordance with the foregoing objects which substantially avoids the problem of decreased effective interior width due to downward bowing of the floor encountered in some prior art constructions.

Briefly, and in accordance with the foregoing objects, a trailer construction in accordance with the invention comprises a floor, a roof and a pair of sidewalls, wherein each of the sidewalls comprises a plurality of similar generally flat rectilinear side panels of predetermined thickness. These side panels are aligned in a side-by-side arrangement and a plurality of joining and panels join and strengthen respective adjacent pairs of these side panels. Each of these joining panels includes at least a relatively flat, rectilinear joining portion of a second predetermined thickness. Coupling means are also provided for coupling the joining panels to respective adjacent pairs of side panels, the aggregate thickness of said side panels and said joining panels being minimized so as to maximize the interior width of the trailer between the interior surfaces of the sidewalls.

In accordance with another aspect of the invention, trailer construction comprises a floor, a roof, and a pair of sidewalls, wherein said floor includes a longitudinal convexity with respect to the interior of said trailer to encourage a substantially flat and level condition of said floor in response to a load applied thereto, to substantially prevent a downward concavity of said floor in response to a load and resultant inward tilting of a first load component placed adjacent one sidewall, to thereby permit loading of a further load component adjacent the other sidewall without interference from said first load component, and thereby maximizing the usable width of said trailer construction between the interior surfaces of said sidewalls.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a partial perspective view, partially in section, of a trailer construction in accordance with the invention;

FIG. 2 is an enlarged broken away perspective view illustrating details of an underfloor support arrangement for the trailer of FIG. 1;

FIG. 3 is a sectional view taken generally in the plane of the line 3—3 of FIG. 2;

FIG. 4 is a sectional view taken generally in the plane of the line 4—4 of FIG. 3;

FIG. 5 is a partial perspective view illustrating a joining and/or strengthening arrangement in accordance with the prior art;

FIG. 6 is a perspective view illustrating a joining and/or strengthening arrangement in accordance with the present invention;

FIG. 7 is a perspective view similar to FIG. 6 illustrating an alternative embodiment of a joining and strengthening arrangement in accordance with the invention;

FIG. 8 is a partial sectional view through a sidewall of a trailer illustrating an alternative strengthening and/or joining arrangement in accordance with the invention;

FIG. 9 is a sectional view similar to FIG. 8 illustrating yet another strengthening and/or joining arrangement in accordance with an alternative embodiment of the invention;

FIG. 10 is a simplified view of the interior of the trailer of FIG. 1, somewhat diagrammatic in form, illustrating bowing of a floor portion thereof as experienced in some prior art constructions;

FIG. 11 is a diagrammatic view similar to FIG. 10 illustrating the floor structure of the trailer in accordance with the invention;

FIG. 12 is a further diagrammatic view similar to FIG. 11 and illustrating loading of the trailer employing the floor construction in accordance with the invention;

FIG. 13 is a top plan view of a fifth wheel mounting plate portion of a trailer constructed in accordance with the invention; and FIG. 14 is a partial perspective view of the fifth wheel mounting plate arrangement of FIG. 13.

DETAILED DESCRIPTION OF THE ILLUSTRATE EMBODIMENT

Referring now to the drawings and initially to FIG. 1, a trailer construction in accordance with the invention is designated generally by the reference numeral 10. Generally speaking, this trailer 10 includes a floor portion 12, a roof 14, and a pair of sidewalls 16, 18. These sidewalls 16 and 18 are substantially identical, wherein the description of any part of one of these sidewalls 16 and 18 hereinafter will be understood to apply to the other as well.

In accordance with a feature of the invention, each of the sidewalls 16, 18 comprises a plurality of similar, generally flat, rectilinear side panels 20, 22 and 24, 26, 28, all of which are of substantially identical dimensions. In this regard, it will be seen that each side panel such as panel 26 is of a predetermined width 30 and height 32. Moreover, as best viewed in FIG. 4, each of these sidewall panels is of a predetermined thickness 34. By way of example only, these panels may be about 0.190 inches thick.

Further in accordance with the invention, the sidewalls 16, 18 also include a plurality of splicers, splicing panels or joining panels 40, 42, 44 etc., for both joining and strengthening respective adjacent pairs of the side panels. In this regard, joining panel 42 will be seen to join adjacent side panels 20 and 22. Each of these joining panels 40, 42, etc. comprises a flat and rectilinear member, defining a joining portion of a thickness of on the same order as the thickness of the respective side panels 20, 22 etc. In the embodiment illustrated in FIGS. 1 through 4 and in FIG. 6, these joining panels comprise only joining portions, unlike alternatively formed panels 42a of FIG. 7 to be discussed later, and are of uniform thickness throughout, as indicated generally by reference numeral 50. Moreover, as best viewed in FIG. 1, the splicing panels or joining panels 40, 42, etc. are of a width 52 equal to a minor fractional portion of the width 30 of the side panels and of a height 54 equal to a major fractional portion of the height 32 of the side panels.

In this later regard, a top rail or roof support or sill member 60 will be seen to extend the length of the trailer 10 and overlie an outer upper surface portion of respective sidewalls 20, 22, etc. Hence, a lower edge portion of this top rail or sill 60 generally abuts upper edges of the respective splicers or joining members 40, 42, etc. The roof 14 is supported by an upper transverse portion of this rail or sill 60 which may be formed as by extrusion to the shape shown in FIG. 1 to accomplish both its attachment to the sidewalls and support of the roof 14 as illustrated. Accordingly, the height of the joining panels 40, 42 is decreased somewhat relative to the sidewall panels 20, 22, in view of this overlapping portion of top rail or sill 60. Rivets 62 may be used to fasten the sill 60 to the side panels 20, 22 etc.

Further in accordance with the invention, coupling means such as rivets 70 are utilized to couple the joining panels to the respective adjacent pairs of side panels so as to both join and strengthen the side panels. Advantageously in this regard, the aggregate thickness of the side panels and joining panels thus assembled is no more than twice the thickness of the side panels alone. This tends to maximize the interior useable width of the trailer construction 10 between the respective interior surfaces of the sidewalls, for example, between sidewalls 20 and 26.

Referring briefly to FIG. 5, it will be seen that one well known prior art construction utilized relatively thin sheets of about 0.050 inch thickness to form sidewalls or side panels 520 and 522, but was compelled to utilize relatively thick frame or rib members 523 for joining and/or strengthening these side panels 520 and 522. In accordance with the well-known prior art construction this joining and/or strengthening rib 523 may be formed by extrusion or by bending from a flat sheet of material similar to the sheets comprising panels 520 and 522. In this regard, a lightweight metal such as aluminum was often utilized for the panels 520 and 522 and for the rib 523. It will be seen that the rib 523 is formed into a generally U-shape with a pair of outwardly extending marginal flanges 525 and 527 to facilitate coupling to the sidewall panels utilizing coupling means such as rivets 529.

However, as compared to the structure of the invention, details of which are illustrated in FIG. 6 to which reference is also invited, the prior art structure of FIG. 5 results in a much thicker aggregate sidewall structure. That is, the prior art structure is illustrated in FIG. 5 results in an effective sidewall thickness equal to the combined thickness of panels 520 or 522 plus the thickness or depth of the U-shaped or channel-like portion of the rib 523. In contrast, the structure in accordance with the invention results in a sidewall having an aggregate thickness which is minimized so as to maximize the interior width of the trailer between interior surfaces of the sidewalls. In the embodiment shown in FIG. 6, this aggregate thickness is only approximately twice the thickness of the side panels 20 and 22, as indicated by reference numerals 34 and 50 in FIG. 4.

Preferably, the side panels 20. 22 etc. comprise plates of relatively lightweight metallic material such as aluminum. By way of example only, these plate s may be about 0.190 inches thick. In the embodiment illustrated in FIGS. 1 through 4, FIG. 6, the joining panels 20, 22, etc. are also comprised of a lightweight metallic material and preferably of the same aluminum material as the side panels.

As best viewed in FIG. 6, in the embodiment of FIGS. 1 through 4 and FIG. 6, each pair of adjacent side panels (such as panels 20 and 22) to be joined are held in substantially side-by-side abutting relation by their associated joining panel (for example 42) and by coupling means 70, such that the joining panel overlaps portions of each side panel 20 and 22. In the embodiment illustrated, joining means 70 comprise a plurality of fasteners, here illustrated as rivets, extending through the respective overlapping portions of each joining panel and the adjacent side panels to be joined.

Referring now to FIG. 7, an alternative embodiment of a joining panel 42a and an alternative method of joining adjacent side panels 20a and 22a is illustrated. This joining panel 42a is also preferably of a lightweight metal such as aluminum and includes a joining portion 72 substantially identical to the panel 42 of FIGS. 1-4 and 6. Additionally a protruding spacing portion 74 is formed integrally with one surface of joining portion 72 and is of a width less than joining portion 72. As with joining panel 42, this joining portion 72 is of a thickness no greater than and preferably equal to the thickness of respective side panels 20a and 22a. Similarly, the spacing portion 74 is of a thickness substantially equal to the thickness of the side panels and is located intermediate and abutting the respective side panels so as to space the panels 20a and 22a apart in a side-by-side alignment by substantially the width of spacing portion 74. Accordingly, the joining portion 72 of joining panel 42a overlaps portions of the spaced apart, adjacent pair of side panels 20a and 22a. As in the embodiment illustrated in FIG. 6, fastener means such as rivets 70 are preferably utilized to couple panel 42a and panels 20a and 22a, these rivets extending through the respective overlapping portions of the respective panels.

Referring now to FIG. 8, another alternative structure for the side panels and joining panels of the invention is illustrated. In FIG. 8, the side panels are designated 20b and 22b and the joining panel is designated 42b. Briefly, each of the side panels and the joining panel comprise a laminated construction or laminate including a core 841 of a relatively lightweight and preferably non-metallic material and respective outer skins 843 and 845 of a relatively thin and lightweight metallic material. The core 841 may comprise a polypropelene or ethylene material. The material used for the skin 843 and 845 may comprise a high strength aluminum or steel material. In the embodiment of FIG. 8, the joining means are shown as fasteners and preferably rivets 70 extending through the overlapping portions of the joining panels and side panels. However, a high strength bonding material might alternatively be utilized, interposed between the facing surfaces of the respective side panels 20b and 22b and joining panel 42b.

Referring now briefly to FIG. 9, a further alternative embodiment of a sidewall construction in accordance with the invention is illustrated. Respective side panels 20c and 22c of FIG. 9 comprise a laminate substantially the same as the laminate forming side panels 20b and 22b described above with reference to FIG. 8. However, the joining or splicing panels comprise a pair of relatively thin panels 42c one coupled with either side of the laminate comprising the side panels. These relatively thin panels, 42c are preferably of a similar metallic material and of similar thickness to the outer skin portion of the laminate comprising the side panels. As with the embodiment of FIG. 8, coupling means in the form of fasteners such as rivets 70 are illustrated. However, a suitable high strength bonding material might alternatively be utilized, applied between facing surfaces of respective joining panels 42c and side panels 20c and 22c.

Referring next to FIGS. 10 through 12, a further problem that has been encountered in prior art trailer designs is that of downward bowing or flexing of the floor portion of the trailer in response to an applied load. Such downward bowing is indicated, for example, generally at reference numeral 80 in FIG. 10, in response to a load 82 being introduced onto floor 12a of trailer 10a. Accordingly, it will be noted that the load 82 tends to tilt inwardly somewhat with respect to trailer 10a as indicated generally by arrow 84. This in turn results in a relatively large space, as indicated generally at arrows 86, between an upper portion of load 82 and an upper portion of the interior sidewall of trailer 10a. As a result of this tilting of load 82, it will be noted that the remaining lateral space or width 88 of the trailer 10a is less than the width 90 of load 82. Thus a second similar load can no longer be accommodated within trailer 10a in a side-by-side condition with load 82. In the case of many standard size containerized or palletized loads, such tilting of a first-loaded unit such as load 82 may thus prevent loading of a further similar containerized or palletized load, thus greatly detracting from the load-carrying capacity of the trailer 10a.

Referring now to FIGS. 1, 11 and 12, and in accordance with a further feature of the invention, the floor 12 is preformed with a slight convexity. That is the floor 12 is bowed upwardly somewhat with respect to the interior of the trailer 10. This convexity has been exaggerated in FIGS. 1 and 11 to facilitate the showing and present discussion thereof. When a first load 82 is loaded onto this convex floor 12, the floor will also tend to deflect or give in the downward direction somewhat as indicated by arrow 80. However, this deflection will result in floor 12 assuming a substantially flat condition as illustrated in FIG. 12. Thus, the load 82 will remain substantially level, maintaining a relatively small, space 86a between load 82 and an inner sidewall surface of the trailer 10. Accordingly, dimension 88a will now be sufficiently greater than the width 90 of load 82 to permit loading of a second load of similar width in a side-by-side condition with load 82.

As an additional matter, as also seen in FIG. 1, a cross beam support system including cross beam members 100 is further preferably utilized transversely of sidewalls 16 and 18 to provide additional support beneath floor 12. These cross beams 100 facilitate the leveling action under load noted above, and also resist compressive forces tending to urge bottom edges of sidewall 16 and 18 relatively inwardly. A plurality of similar cross beam members 100 are spaced apart along the length of trailer 10, and preferably are used at least intermediate the areas of sidewalls 16 and 18 over which the joining panels 40, 42 etc. extend.

Referring now more particularly to FIGS. 2 through 4, it will be seen that cross beam 100 includes a pair of end plates such as end plate 102 joined thereto, preferably by welding as indicated 103. These end plates are utilized to couple the cross beams to the sidewalls, at least at the locations of joining panels 40, 42 etc. as mentioned. Preferably, a plurality of fastener means, here illustrated as nuts and bolts 104, 106 are utilized for joining the cross beams with the side panels and joining panels. These bolts 104 extend respectively through the aligned portions of the end plates 102, side panels 24, 26 and joining panel 44.

In accordance with the preferred embodiment illustrated in FIGS. 1 through 4, the trailer construction further includes a lower side rail member 110 extending generally longitudinally along the length of each sidewall 16 and 18 and located intermediate the side panels and the end plates 102 of cross beams 100. As illustrated, this side rail 110 comprises a generally Z-shaped member having an upper lip or flange portion 112 extending generally inwardly to overlie a portion of floor 12 and a lower lip or flange 114 extending generally outwardly to underlie respective lower edge parts of the side panels and of the joining panels. Accordingly, the fasteners or bolts 104 extend through this lower side rail member as well.

A further plurality of fasteners designated generally in FIG. 1 by reference numeral 120, and which preferably take the form of rivets are utilized to further secure the side rail members 110 with those portions of side panels 20, 22 etc. away from joining panels 40, 42 etc. In this regard, the fasteners 104, 106 are preferably more numerous in the vertical direction with respect to the sidewalls than the latter fasteners 120 so as to assure secure joining of the cross-member end plates, lower side rails, side panels and joining panels thereby.

Referring now to FIGS. 13 and 14, and in accordance with a further feature of the invention, a fifth wheel coupler member or plate 130 is also mounted transversely of the sidewalls 16 and 18 and below the floor 12. As is generally known in the art, a fifth wheel assembly is generally provided toward a front or forward end of a trailer to provide a support when the trailer is not attached to a tractor for hauling. Accordingly, the fifth wheel coupler member or plate 130 is mounted transversely of the trailer sidewalls toward the front portion thereof to mount this fifth wheel assembly. In the illustrated embodiment, the fifth wheel coupler or plate comprises a generally flat plate-like member having opposite upwardly turned edge flange portions 132 and 134 for coupling with the sidewalls 16 and 18.

In accordance with a further feature of the invention, additional ones of the joining panels designated in FIGS. 13 and 14 by reference numerals 142, 144 and 152, 154 are interposed over and coupled with portions of sidewall panels 140 and 150 adjacent the mounting thereto of the coupler member or plate 130. These latter joining panels 142, 144, 152, 154 are utilized for strengthening the respective sidewalls so as to provide additional support for the coupler member or plate 130 and fifth wheel assembly to be mounted thereto. The panels 142, 144 and 152, 154 are substantially identical to joining panel 42 described above. Suitable fasteners 160, 162 are utilized to couple the respective flanges 132 and 134 of fifth wheel coupler 130 with respective side panels 140, 150 and the associated joining panels 142, 144 and 152, 154.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim of the appended claims is to cover all such changes and modifications as fall within the true spirit and scope of the invention.

The invention is claimed as follows:

1. A trailer body construction comprising a floor, a roof, and a pair of sidewalls, wherein each of said sidewalls comprises a plurality of similar, generally flat rectilinear side panels of lightweight metallic material of a predetermined thickness, width and height aligned side-by-side in contiguous abutting relation, and a plurality of joining panels of second lightweight metallic material situated only on one surface of each sidewall for joining and strengthening respective adjacent pairs of said side panels; each said joining panel including at least a relatively flat rectilinear plate-like joining portion of a thickness of about the thickness of said side panels, of a with equal to a minor fractional portion of the width of said side panels, and of a height equal to a major fractional portion of the height of said side panels; and a plurality of fasteners for coupling said joining panels to respective adjacent pairs of said side panels to both join and strengthen said side panel.

2. A trailer construction according to claim 1 wherein each of said joining panels is of uniform thickness throughout and wherein each pair of adjacent side panels to be joined are held in substantially side-by-side abutting relation by said joining panel and said coupling means such that said joining panel overlaps end portions of each said side panel to be joined thereby.

3. A trailer construction according to claim 1 wherein said coupling means comprises a plurality of fasteners extending through the overlapped portions of each said joining panel and the side panels to be joined thereby.

4. A trailer construction according to claim 1 wherein said coupling means comprises rivets extending through said overlapping portions of the respective joining panel joining portions and side panels.

5. A trailer construction according to claim 1 and further including a plurality of spaced apart cross-beams transversely joining said sidewalls beneath said floor and each including respective end plates for coupling to said sidewalls; said cross-beams being located at least transversely of and joining said sidewalls at the locations of said joining panels.

6. A trailer construction according to claim 5 and further including a plurality of fastener means for joining said cross-beams with the respective side panels and joining panels and extending therethrough.

7. A trailer construction according to claim 1 and further including a fifth wheel coupler member mounted transversely of said sidewalls and below said floor, and additional panels configured congruently to said joining panels interposed over and coupled with predetermined portions of said side panels in the region of the mounting of said coupler member therewith for strengthening said sidewalls to provide additional support for said coupler member.

8. The trailer construction according to claim 1 further comprising a generally Z-shaped member situated along the lower edge of each sidewall, the Z-shaped member having an upper flange extending inwardly to overlie a portion of said floor and a lower flange extending outwardly to underlie a lower edge of said side panels.

9. The trailer construction of claim 8 wherein the lower flange extends outwardly to the outer surface of said joining panels.

10. The trailer construction according to claim 8 wherein each Z-shaped member includes an intermediate portion between said upper flange and said lower flange situated contiguously to an inner surface of each sidewall.

11. The trailer construction of claim 10 wherein the inner flange overlies a space situated between a lateral edge of said floor and the intermediate portion of the Z-shaped member.

12. A trailer body construction comprising a floor, a roof, and a pair of sidewalls, wherein each of said sidewalls comprises a plurality of similar, generally flat rectilinear side panels of lightweight metallic material of a predetermined thickness, width, and height aligned side by side in contiguous abutting relation, and a plurality of joining panels of said lightweight metallic material situated on only the exterior surface of each sidewall for joining and strengthening respective adjacent pairs of said side panels so as to form a substantially smooth interior surface on each sidewall; each of said joining panels comprising a generally flat rectilinear plate-like member of a thickness of about the thickness of said side panels, of a width equal to a minor fractional portion of the width of said side panels, and of a height equal to a major fractional portion of the height of said side panels, the lower end of each joining panel being coterminous with the lower edge of the side panels with which it is situated; a plurality of fasteners coupling said joining panels to respective adjacent pairs of said side panels to both join said side panels and strengthen said sidewall formed thereby; a plurality of spaced-apart cross-beams transversely situated beneath said floor, each cross-beam including respective end plates for coupling to said sidewalls, said cross-beams being located at least transversely of said sidewalls at the locations of said joining panels; a lower side rail member extending longitudinally along the length of each sidewall and intermediate said side panels and said end plates of said cross-beams and having an outwardly extending longitudinal flange portion underlying a lower edge of the sidewalls; and a further plurality of fastener means extending through said lower side rail members for securely joining said cross member end plates.

13. A trailer construction in accordance with claim 12 further including a fifth wheel coupler member mounted transversely of said sidewalls and below said floor, and additional panels configured congruently to said joining panels interposed over and coupled with predetermined portions of said side panels in the region of the mounting of said coupler member therewith for strengthening said sidewalls to provide additional support for said coupler member.

14. A trailer construction according to claim 12 wherein the aggregate thickness of the side panel and joining panel is no more than about twice the thickness of the side panel alone.

15. A trailer construction in accordance with claim 12 wherein the side panels consist essentially of plates of aluminum having a thickness of about 0.190 inches.

* * * * *

UNITED STATES PATENT AND TRADEMARK OFFICE
CERTIFICATE OF CORRECTION

PATENT NO.  : 4,904,017
DATED       : February 27, 1990
INVENTOR(S) : TRAILER CONSTRUCTION It is certified that error appears in the above-identified patent and that said Letters Patent is hereby corrected as shown below:

At column 2, lines 45 through 58 should be deleted.

Signed and Sealed this

Thirteenth Day of August, 1991

Attest:

HARRY F. MANBECK, JR.

*Attesting Officer*   *Commissioner of Patents and Trademarks*